United States Patent [19]

Levecque et al.

[11] 4,118,213

[45] Oct. 3, 1978

[54] METHOD AND APPARATUS FOR FIBERIZING ATTENUABLE MATERIALS AND PRODUCT THEREOF

[75] Inventors: Marcel Levecque, Saint-Gratien; Jean A. Battigelli; Dominique Plantard, both of Rantigny, all of France

[73] Assignee: Saint-Gobain Industries, Neuilly-sur-Seine, France

[21] Appl. No.: 676,755

[22] Filed: Apr. 14, 1976

Related U.S. Application Data

[63] Continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Feb. 9, 1976 [FR] France .................... 76 03416

[51] Int. Cl.² .......................................... C03B 37/04
[52] U.S. Cl. ............................................ 65/5; 65/16; 264/5; 264/12; 425/7
[58] Field of Search ................. 65/5, 16; 264/5, 12, 264/176 F; 106/50; 425/7

[56] References Cited

U.S. PATENT DOCUMENTS

| | | | |
|---|---|---|---|
| 2,126,411 | 8/1938 | Powell | 65/5 |
| 2,578,101 | 12/1951 | Stalego | 65/16 |
| 2,814,832 | 12/1957 | Stephens | 65/5 |
| 3,357,808 | 12/1967 | Eberle | 65/16 X |
| 3,874,886 | 4/1975 | Levecque et al. | 65/5 X |

*Primary Examiner*—Robert L. Lindsay, Jr.
*Attorney, Agent, or Firm*—John T. Synnestvedt

[57] ABSTRACT

Method and apparatus are disclosed for converting a stream of attenuable material into a fiber by a two-stage attenuation technique, the two stages being effected sequentially by employment of a gaseous jet and a gaseous blast, thereby producing a single long fiber from each stream of attenuable material.

31 Claims, 3 Drawing Figures

METHOD AND APPARATUS FOR FIBERIZING ATTENUABLE MATERIALS AND PRODUCT THEREOF

CROSS REFERENCES

The present application is a continuation-in-part of our application Ser. No. 557,282 filed Mar. 11, 1975, now U.S. Pat. No. 4,015,964, which, in turn, is a continuation-in-part of our application Ser. No. 353,984 filed Apr. 24, 1973 and issued May 27, 1975 as U.S. Pat. No. 3,885,940. The subject matter of said patent is also disclosed in the related Levecque and Battigelli U.S. Pat. No. 3,874,886.

BACKGROUND

The invention relates to the production of fine fibers from attenuable materials, particularly attenuable materials which soften upon entering a molten state as a result of the application of heat and which harden or become relatively solid upon cooling.

The method and equipment of the invention are especially suited to the formation of fibers from glass and the disclosure herein accordingly emphasizes production of glass fibers from molten glass.

Many techniques are already known for production of fibers from molten glass, some of the techniques most widely used heretofore being identified and briefly described just below.

1. Longitudinal Blowing: Other terms sometimes used include "blown fiber", "steam blown wool", "steam blown bonded mat", "low pressure air blowing", or "lengthwise jets".
2. Strand: Other terms sometimes used are "continuous filament", or "textile fibers".
3. Aerocor: Another term sometimes used is "flame attenuation".
4. Centrifuging: Other terms sometimes used include "rotary process", "centrifugal process", "tel process", or "supertel process".

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques, for the most part have not met with sufficient success to achieve a separate and recognizable status in the art.

The four techniques above referred to may briefly be described as follows.

1. Longitudinal Blowing

Longitudinal blowing (examples of which are referred to as items 1, 2, 3 and 4 in the bibliography herebelow) is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

There are two longitudinal blowing techniques. In the first technique the attenuating blasts engage already drawn fibers and the product resulting is typically a mat, commonly known as "steam blown bonded mat", suitable for reinforcement. In the second longitudinal blowing technique the attenuating blasts strike directly on larger streams of molten glass and the product resulting is typically an insulation wool commonly known as "steam blown wool".

In a variation (see item 5) of the first longitudinal blowing technique, the entire bushing structure and associated furnace are enclosed within a pressure chamber so that, as the streams of glass emerge from the bushing, the streams are attenuated by pressurized air emerging from the pressure chamber through a slot positioned directly beneath the glass emitting tips of the bushing, this variation being commonly referred to as "low pressure air blowing", and products being commonly known as "low pressure air blown bonded mat and staple yarn".

2. Strand

The strand glass fiber manufacturing process (see items 6 and 7) begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art in the field of the strand process is extensive but is of no real significance to the present invention. Strand techniques therefore need not be further considered herein.

3. Aerocor

In the aerocor process (see items 8 and 9) for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process (see items 10 and 11) molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

In addition to the four categories of fiber forming techniques which have been very generally referred to and distinguished above, various refinements and variations of those techniques have also been known and repeated efforts have been made to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic fibers (see item 12), or through the use of confining jets (see items 13 and 14), or both (see item 15).

The approach taken in the just mentioned prior art technique suggests that the realization of optimum fiberization lies in extending the length of a single attenuating zone.

In contrast, in the practice of the present invention, attenuation is accomplished by subjecting a glass stream to two sequential stages of attenuation, performed under different conditions, as will further appear.

Various other approaches have been suggested for introducing glass in the molten state into an attenuating blast (see items 16, 17, 18 and 19). In such attempts to introduce a stream of molten glass into an attenuating blast it has been noted that there often is a tendency for the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher (item 16), and the transfer of substantial kinetic energy to the glass stream as, for example, by the modifications of the centrifuging process taught in Levecque (item 11), Paymal (item 18), and Battigelli (item 19).

An alternate approach to the problem, more closely akin to the aerocor process, has been the introduction of the glass in the form of a solid (item 9) or pre-softened (item 20) glass rod or in the form of powdered glass (item 14).

| BIBLIOGRAPHY OF PRIOR PATENTS | |
|---|---|
| (1) | Slayter et al 2,133,236 |
| (2) | Slayter et al 2,206,058 |
| (3) | Slayter et al 2,257,767 |
| (4) | Slayter et al 2,810,157 |
| (5) | Dockerty 2,286,903 |
| (6) | Slayter et al 2,729,027 |
| (7) | Day et al 3,269,820 |
| (8) | Stalego 2,489,243 |
| (9) | Stalego 2,754,541 |
| (10) | Levecque et al 2,991,507 |
| (11) | Levecque et al 3,215,514 |
| (12) | Stalego 2,687,551 |
| (13) | Stalego 2,699,631 |
| (14) | Karlovitz et al 2,925,620 |
| (15) | Karlovitz 2,982,991 |
| (16) | Fletcher 2,717,416 |
| (17) | Eberle 3,357,808 |
| (18) | Paymal 3,634,055 |
| (19) | Battigelli 3,649,232 |
| (20) | Stalego 2,607,075 |

General Statement of the Invention and Objects

In contrast with all of the foregoing prior art techniques, it is a major objective of the present invention to provide certain improvements in the production of fibers from streams of molten glass or similar attenuable materials. The technique of the present invention in part utilizes the fiber toration techniques or principles disclosed in our prior applications above identified Ser. No. 557,282, now U.S. Pat. No. 4,015,964, and Ser. No. 353,984, which latter is now U.S. Pat. No. 3,885,940.

Thus, the technique of the present invention makes use of the attenuating capability of a zone of interaction developed by the direction of a secondary jet of relatively small cross section transversely into a principle blast or jet of relatively large cross section. However, according to the present invention, instead of directly admitting or delivering a stream of molten glass to the zone of interaction, the glass stream is delivered from an appropriate orifice spaced an appreciable distance above the zone of interaction.

Moreover, in a typical technique according to the present inventon, the blast is discharged in a generally horizontal direction, the glass admission orifices are arranged in spaced relation above the blast, and at an intermediate elevation, secondary jets are discharged downwardly toward the blast from jet orifices positioned adjacent to the decending glass streams, and preferably inclined somewhat with respect to the vertical, so that the glass streams enter the influence of the jets at a point above the upper boundary of the blast, but well below the glass orifices. Preferably also each secondary jet orifice and the associated glass stream are spaced from each other in a direction upstream and downstream of the direction of flow of the blast, with the jet orifice located, with respect to the direction of flow of the blast, on the upstream side of the glass stream.

The system of the invention, as just briefly described, functions in the following manner:

Each secondary jet, being spaced appreciably above the upper boundary of the blast, causes induction of the ambient air so that the jet develops a sheath or envelope of induced air which progressively increases in diameter as the upper boundary of the blast is approached. The jet thus is comprised of two portions, i.e. the core itself which is initially delivered from the jet orifice and the main body of the jet which is frequently referred to as the mixing zone, i.e. the zone represented by the mixture of the gas of the core with induced air.

In a typical embodiment, the jet core extends for a distance beyond the jet orifice equal to from 3 to 10 times the diameter of the jet orifice, depending primarily upon the velocity of the jet through the orifice. Since in installations of the kind here involved, the jet orifices are of only very small diameter, the extent to which the jet core is projected beyond the orifice is relatively short. The jet core is conical and the mixing zone surrounds the jet core from the region of delivery from the jet orifice and is of progressively increasing diameter downstream of the jet, including a length of travel extended well beyond the tip of the jet core cone. In such a typical installation, the spacing between the jet orifice and the boundary of the blast is such that the point of intersection of the blast lies beyond the tip of the core, although with certain proportions the jet core may come close to or somewhat penetrate the blast. In any event, it is contemplated that at the point of intersection of the jet and blast, the body of the jet or jet stream retains sufficient kinetic energy or velocity to penetrate the blast and thereby develop a zone of interaction between the jet and the blast. This zone of interaction has the same general characteristics as the zone of interaction referred to and fully described in our prior applications Ser. No. 557,282 and Ser. No. 353,984, above identified.

With the foregoing in mind, attention is now directed to the glass stream and its behavior in relation to the jet and blast. As already noted, the glass stream is delivered from an orifice spaced above the blast and also spaced appreciably above the point of delivery or discharge of the secondary jet. Preferably the glass discharge orifice is so located as to deliver a stream of glass which by free-fall under the action of gravity will follow a path which would intersect the axis of the jet at a point appreciably above the upper boundary of the blast and thus also above the zone of interaction. As the glass stream approaches the jet, it is influenced by the currents of induced air and is thereby caused to deflect toward the jet above the point where the glass stream would otherwise have intersected the axis of the jet. The induction effect causes the stream of glass to approach the jet and, depending upon the position of the glass orifice, the induction effect will either cause the glass stream to enter the envelope of induced air surrounding the core, or will cause the glass stream to enter the main body of the jet at a point downstream of the jet core. In either case, the glass stream will follow a path leading into the mixing zone and the glass stream will travel within the body of the jet downwardly to the zone of interaction with the blast.

Thus, the glass stream is carried by the induced air currents into the mixing zone of the jet, but does not penetrate the jet core. The glass stream may be carried by the induced air to the surface of the jet core, but will not penetrate the core, which is desirable in order to avoid fragmentation of the glass stream. Since the glass stream is at this time in the influence of the mixing zone of the jet, the stream of glass will be subjected to a preliminary attenuating action and its velocity will increase as the upper boundary of the blast is approached.

In addition to this attenuating action, which is aerodynamic in character, the attenuating stream is subjected to certain other dynamic forces tending to augment the attenuation. This latter attenuation action is caused by the tendency for the attenuated stream to move toward the center of the jet and then be reflected toward the boundary of the jet into the influence of the air being induced. The attenuating stream is then again caused to enter into the interior of the jet. This repeated impulsion supplements the aerodynamic attenuating action.

In the region of interaction with the blast, the partially attenuated stream of glass will be caused to enter the zone of interaction, in part because of the acceleration of the glass resulting from the action of gravity and from the preliminary attenuation described just above, and in part under the influence of the currents established in the zone of interaction itself, in the manner fully explained in our prior applications Ser. No. 557,282 and Ser. No. 353,984, above identified.

Thus it will be seen, that according to the invention, the glass stream is subjected to two successive stages of attenuation. It is also to be observed that since the glass stream is caused to come under the influence of the jet by virtue of the induced currents surrounding the jet, the preliminary attenuation is accomplished without fragmenting the glass stream. Moreover the succeeding or second stage of attenuation which is effected in the zone of interaction between the jet and the blast is also accomplished without fragmenting the fiber being formed. By this two stage attenuating technique it is thus possible to produce long fibers.

The technique of the present invention has important advantages as compared with various prior techniques. Thus, it provides a technique for the production of long fibers while at the same time making possible greater separation between certain components of the equipment, notably the blast generator or burner, with its nozzle or lips, the jet nozzle and the gas or air supply means associated therewith and the glass supply means including the bushing or similar equipment having glass orifices. This separation of components is not only of advantage from the standpoint of facilitating the structural installation, but is further of advantage because the separation makes possible more convenient and accurate regulation of operating conditions, notably temperature of the blast, jets and glass supply means. Still another advantage of the arrangement according to the present invention, is that the spacing of the glass supply means with its orifices for discharging streams of glass makes possible the utilization of larger glass orifices (which is sometimes desirable for special purposes or materials) because, in the distance of free-fall provided for the glass streams, such streams decrease in diameter under the influence of the gravitational acceleration. The streams should of course be of relatively small diameter at the time of initiation of attenuation, and the desired small diameter can readily be achieved, because of the distance of free-fall, notwithstanding the employment of delivery orifices of relatively large size.

The foregoing has still another advantageous feature, namely the fact that a higher temperature may be utilized in the glass bushing or other supply means, thereby enabling use of attenuable materials at higher temperatures, because during the distance of free-fall of the glass stream, the stream is somewhat cooled because of contact with the surrounding air, thereby bringing the stream down to an appropriate temperature for the initiation of attenuation.

Because of various of the foregoing factors, the system of the present invention facilitates the use of certain types of molten materials in the making of fibers, for instance slag or certain special glass formulations which do not readily maintain uniformity of flow through discharge orifices of small size. However, since both larger diameter discharge orifices and higher temperatures may be used in the supply of the molten material, it becomes feasible to establish uniformity of feed and attenuation even with certain classes of attenuable materials which could not otherwise be employed in a technique based upon production of fibers by attenuation of a stream of molten material.

It is also noted that various of the four principle prior art techniques referred to above are subject to a number of limitations and disadvantages. For example, various of the prior techniques are limited from the standpoint of production capacity or "orifice pull rate", i.e. the amount of production accomplished within a given time by a single fiber producing center. In other cases, the fiber product contains undesirable quantities of unfiberized material. Strand type of operations, while effective for producing strand material, are not best suited for production of insulation type of fiber blanket and other similar types of products. Centrifuging, while effective for producing fiber insulation blanket has the disadvantage that the centrifuge must rotate at high speed, thus necessitating special working parts and maintenance, and further because the centrifuge is required to be formed of special alloys capable of withstanding the high temperatures.

Another general objective of the present invention is to provide a technique which overcomes various of the foregoing disadvantages or limitations of the prior art techniques referred to.

Moreover, the technique of the present invention provides for high production rates and utilizes only static equipment.

DETAILED DESCRIPTION OF THE INVENTION

The accompanying drawings illustrate, on an enlarged scale, a preferred embodiment of the present invention, and in these drawings

Figure 3:
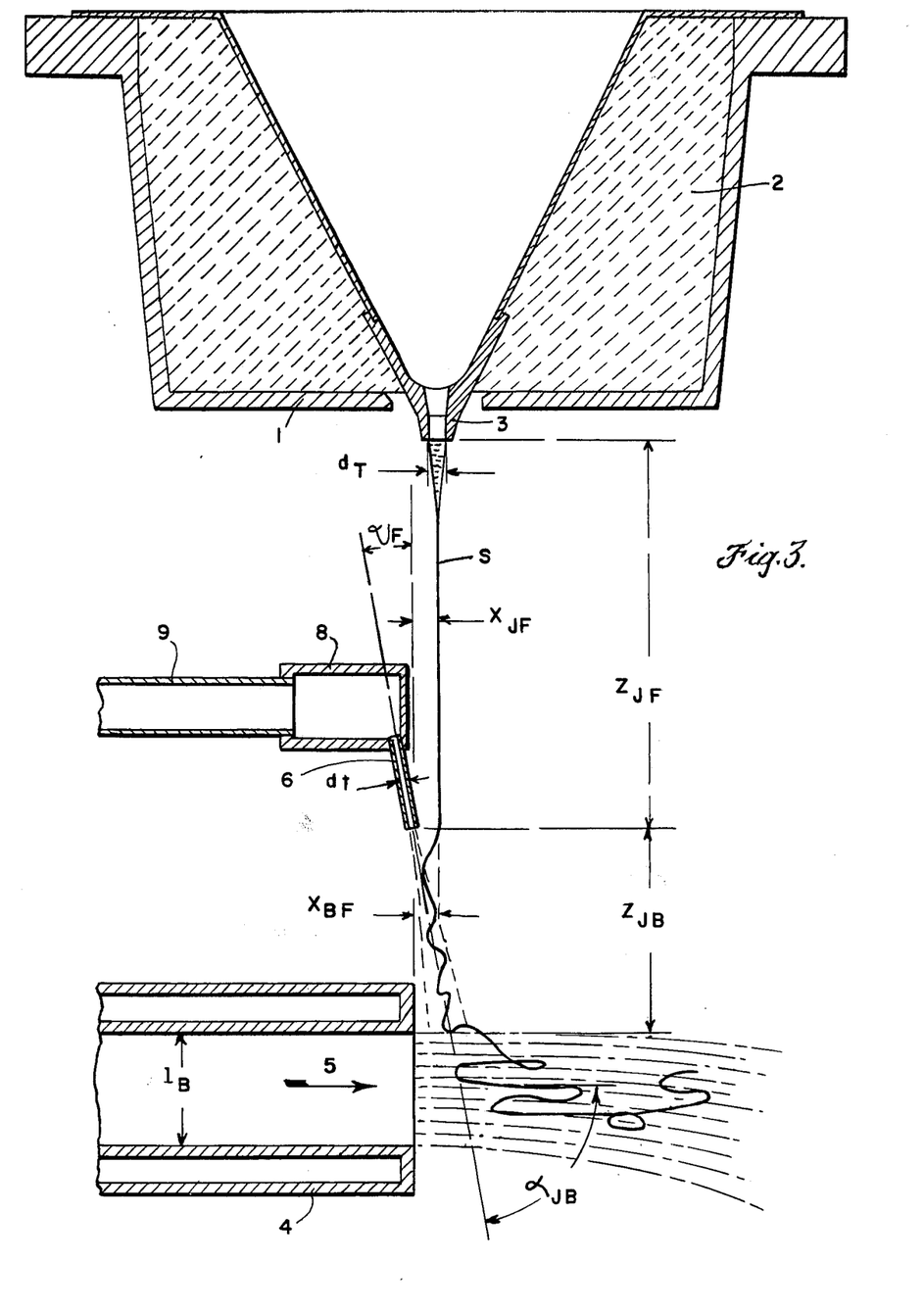
FIG. 3 is a view similar to FIG. 2 but more diagrammatic and further illustrating certain dimensional relationships to be taken into account in establishing operating conditions in accordance with the preferred practice of the present invention.

In the drawings, the glass supply means includes a crucible or bushing 1 which may be supplied with molten glass in any of a variety of ways, for instance by means of the forehearth indicated at 2 in FIG. 3. Glass supply orifices 3 deliver streams of molten glass downwardly under the action of gravity as indicated at S.

A gaseous blast is discharged in a generally horizontal direction from the discharge nozzle 4, the blast being indicated by the arrow 5. The blast may originate in a generator, usually comprising a burner, so that the blast consists of the products of combustion, with or without supplemental air.

As will be seen from the drawings, the blast is directed generally horizontally below the orifices 3 from which the glass streams S are discharged.

At an elevation intermediate the crucible and the blast discharge device 4, jet tubes 6 are provided, each having a discharge orifice 7, the jet tubes receiving gas from the manifold 8 which in turn may be supplied through the connection fragmentarily indicated at 9.

The gases for delivery to and through the jet tubes 6 may originate in a gas generator taking the form of a burner and the products of combustion may serve for the jet, either with or without supplemental air. Preferably the combustion gases are diluted with air so as to avoid excessively high temperature of the gas delivered through the jet tubes.

Each jet tube 6 and its orifice 7 is arranged to discharge a gaseous jet downwardly at a point closely adjacent to the feed path of one of the glass streams S and preferably at the side of the stream S which, with respect to the direction of flow of the blast 5, is upstream of the glass stream. Moreover, each jet tube 6 and its orifice 7 is arranged to discharge the jet in a path directed downwardly toward the blast and which is inclined to the vertical and so that the projection of the paths of the glass stream and the jet intersect at a point spaced above the upper boundary of the blast 5.

It is contemplated that the vertical dimension of the blast and also the width thereof be considerably greater than the cross sectional dimensions of each secondary jet, so that adequate volume of the blast will be available for each jet to develop a zone of interaction with the blast. For this purpose also, it is further contemplated that the kinetic energy of the jet in relation to that of the blast, in the operational zone of the jet and blast, should be sufficiently high so that the jet will penetrate the blast. As pointed out in our applications Ser. No. 557,282 and Ser. No . 353,984, this requires that the kinetic energy be substantially higher than that of the blast, per unit of volume. Still further, the jet preferably has a velocity considerably in excess of the velocity of the glass stream as fed under the action of gravity downwardly toward the point of contact with the jet and sometimes also in excess of the velocity of the blast.

Figure 2:
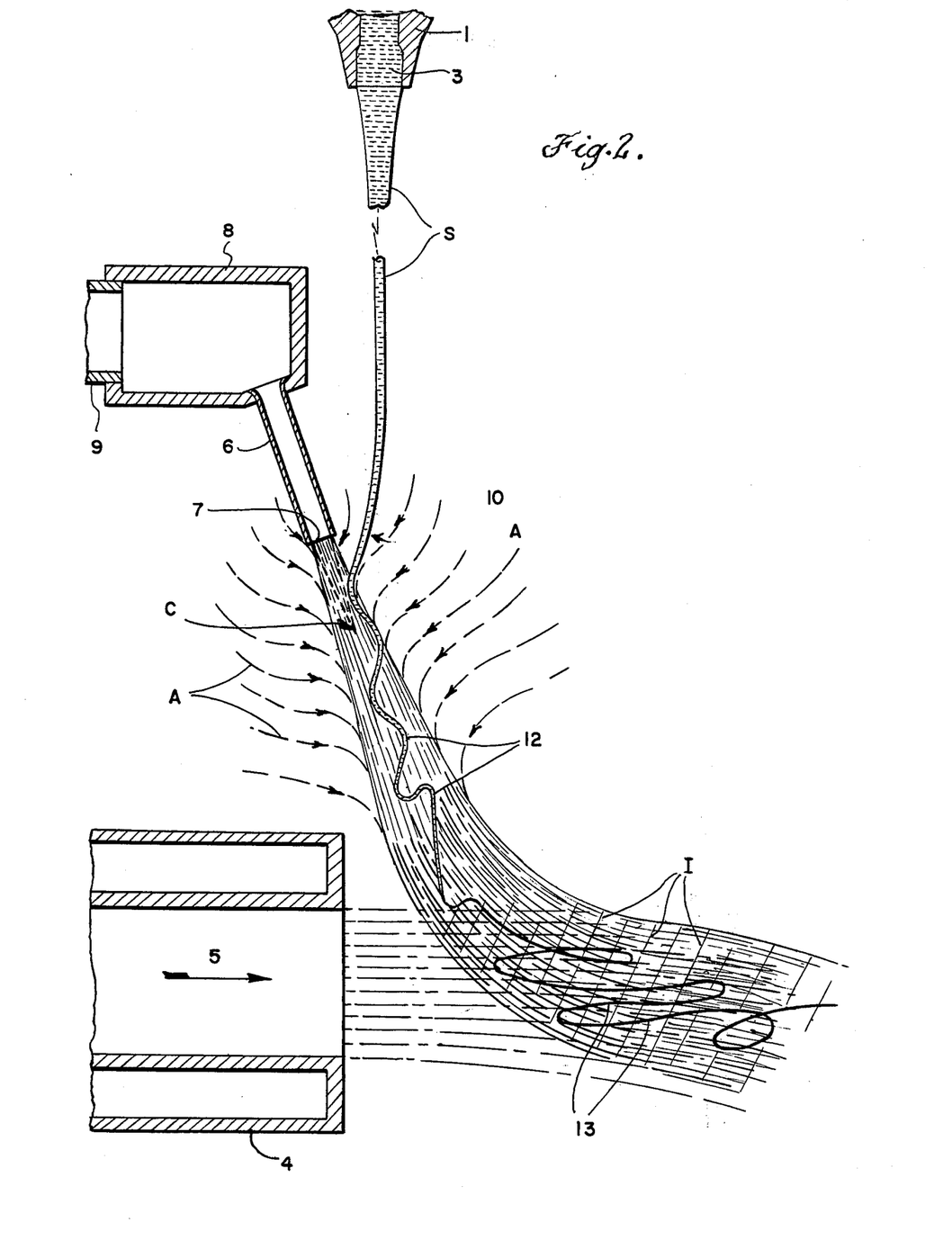
FIG. 2 is a vertical sectional view through equipment for establishing a single fiberizing station as arranged according to the present invention.

The operation of each fiberizing center is as follows:

From the drawings and especially from FIG. 2, it will be seen that the core C of the jet causes the induction of currents of air indicated by the lines A, the amount of air so induced progressively increased along the path of the jet. When the body of the jet, i.e. the gas of the core intermixed with the induced air, reaches the boundary of the blast, a zone of interaction is established in the region indicated by cross-lining marked I in FIG. 2.

As the stream S of molten glass descends and approaches the jet delivered from the orifice 7, the currents of air induced by the action of the jet cause the stream of glass to deflect toward the jet core as indicated at 10. Although the glass orifice 3 may be of substantially larger diameter or cross section than the jet orifice 7, the gravity feed of the glass stream S results in substantial reduction in diameter of the glass stream, so that when the stream meets the jet, the diameter of the stream is much smaller than the diameter of the glass orifice. With the higher velocity of the jet, as compared with that of glass stream, even when the glass stream meets the jet in the upstream region adjacent the jet core, the glass stream will not penetrate the jet core. However, because of the induced air currents surrounding the jet, the glass stream is caused to "ride" on the surface of the jet core within the surrounding sheath of induced air or to enter the body of the jet downstream of the jet core.

The action of the induced air in bringing the glass stream to the jet stabilizes the feed of the glass stream and will also assist in compensating for minor misalignment of the glass orifice with respect to the jet orifice. Because of the reliance upon induction effects of an isolated jet, the glass stream is brought into the mixing zone of the gas originating in the jet core and the induced air without subdivision or breakage of the stream or the fiber being formed. This action is enhanced by virtue of the fact that in the arrangement as above described and illustrated, the glass stream is not subjected to any sharp angled change in its path of movement before it has been subjected to some appreciable attenuation, thereby reducing its diameter and inertia.

In consequence of the glass stream being carried in the mixing zone of the jet, the glass stream is partially attenuated, this action representing the first stage of the two-stage attenuation above referred to. In turn, in consequence of this partial attenuation, the length of the embryonic fiber is increased, and this increase in length is accommodated by an undulating or whipping action, thereby forming loops, as indicated at 12. It is to be noted, however, that the glass stream remains intact, the loops of the embryonic fiber being carried downwardly in the mixing zone.

At the point where the blast 5 intercepts the jet, the jet penetrates the blast. This penetration of the blast by the jet establishes currents in the zone of interaction of the jet with the blast, which currents carry the partially attenuated glass stream into the interior of the blast and in consequence a second stage of attenuation occurs. This results in further increase in the length of the fiber being formed. The increase in fiber length is accommodated by additional undulating or whipping action, forming further enlarged loops as indicated at 13 within the blast. Notwithstanding this action, a typical fiber will remain intact and will be carried away by the blast flow in the form of a fiber of considerable length. Thus a single stream of molten glass is converted into a single glass fiber by a two-stage attenuation operation. It will be understood that in effecting this two-stage attenuation, the temperature of the glass and the temperature of the jet, as well as the temperature of the blast, are established at values which will retain the glass in attenuable condition throughout the first stage of attenuation and throughout the second stage until the attenuation has been completed in the zone of interaction between the jet and the blast.

Figure 1:
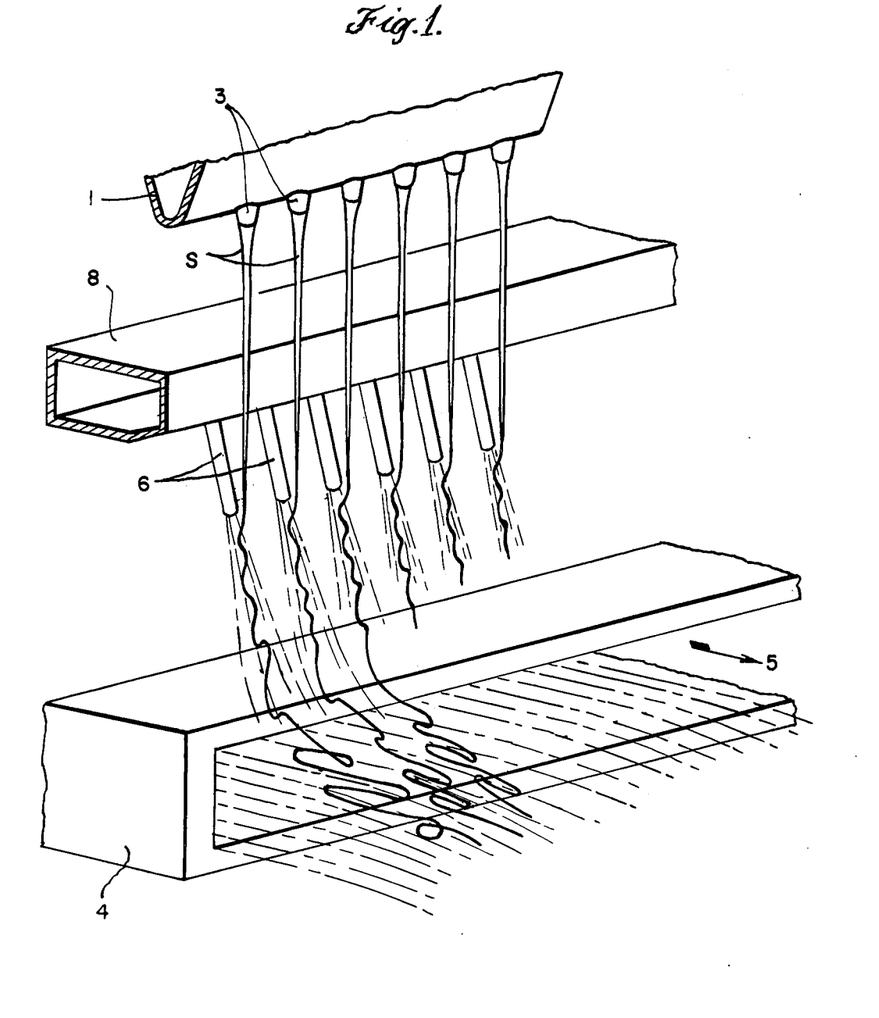
FIG. 1 is a fragmentary isometric view showing equipment including means for developing a blast, means for developing a series of secondary jets above the blast and directed downwardly toward the blast, together with means for establishing glass streams delivered by gravity from a region above the jets downwardly into the zone of influence of the jets and ultimately into the influence of the zone of interaction with the blast.

In connection with the arrangement of the invention, it is to be understood that fiberizing centers may be arranged in multiple, as illustrated in FIG. 1. This is accomplished by employing a blast 5 which is broad or of large dimension in the direction perpendicular to the plane of FIG. 2, and by employing a similarly extended crucible 1 having a multiplicity of glass orifices, and further by employing a multiplicity of jet tubes 6 each having an orifice adjacent to one of the streams S of glass being delivered from the several glass orifices, all as shown in FIG. 1. Such a multiplicity of jet tubes may be supplied with the jet gas from a common manifold 8.

The disclosure of the above identified applications Ser. No. 557,282 and Ser. No. 353,984, may be referred to for further information in connection with the general arrangements providing for accommodation of multiple fiberizing centers and also for numerous other features, such, for example, as fiber collection means, glass feed systems and blast and jet generating and delivery systems, and including also information concerning the parameters involved in establishing a zone of interaction of a jet and blast.

In connection with various dimensional relationships involved in the equipment of the present invention, particular attention is directed to FIG. 3 on which certain symbols have been applied to identify some of the dimensions. These are identified in the following table which also gives an average or typical value in milimeters, as well as a usable range for each such value.

| FEATURE | DIMENSION | SYMBOL | AVERAGE VALUE (mm) | VARIATION LIMITS (mm) |
|---|---|---|---|---|
| Bushing | Diameter of glass orifice | $d_T$ | 4 | 1 – 10 |
|  | Distance between 2 holes |  | 10 | 5 → |
| Jet | Inner diameter of jet tube | $d_t$ | 1 | 0.3 – 3 |
|  | Outer diameter of jet tube |  | 1.5 | 0.7 – 5 |
|  | Separation between 2 tubes |  | 10 | 5 → |
| Blast | Vertical distance between the lips or thickness of the discharge section | $l_B$ | 25 | 10 – 50 |
|  | Width of the discharge section |  | 300 | 20 – 500 |

In addition to the foregoing dimensions, certain spacing relationships and also angular relationships should be observed, as indicated in the following table which gives an average or typical value in milimeters or degrees, as well as a usable range for each such value.

| FEATURES | SYMBOL | AVERAGE VALUE (mm or degree) | VARIATION LIMITS (mm or degree) |
|---|---|---|---|
| Vertical distance of jet discharge orifice to the upper boundary of flow of the blast | $Z_{JB}$ | 45 | 30 – 60 |
| Vertical distance from the discharge opening of the glass stream to the jet discharge orifice | $Z_{JF}$ | 85 | 0 – 150 |
| Horizontal distance from the axis of the glass stream to the jet discharge orifice | $X_{JF}$ | 5 | 1 – 15 |
| Horizontal distance from the axis of the glass stream to the lip of the blast nozzle | $X_{BF}$ | 5 | 0 – 30 |
| Angle of jet tube to the axis of glass stream | $\alpha_{JF}$ | 10° | 3° – 45° |
| Angle of jet tube to the direction of flow of the blast | $\alpha_{JB}$ | 80° | 87° – 45° |

With further reference to parameters of operation when employing the technique of the present invention, it is first pointed out that it is of course important that the glass be discharged from the glass orifice in a continuous stable stream. For this purpose, the rate of glass flow, the temperature of the bushing and the diameter of the glass discharge orifice should preferably be above certain predetermined limits. Thus, the pull rate of glass should be greater than 60 kg/hole for each 24 hour period; the bushing temperature should be greater than 1250° C., and the diameter of the glass discharge orifice should be greater than 2.5 milimeters. With at least certain types of glass formulations, observing these limits may assist in avoiding pulsations which have a tendency to accentuate until distinct droplets are formed. This phenomenon is incompatible with proper fiberization. In a typical or average working condition, the following values are appropriate; 100 kg/hole per day, bushing temperature 1400° C., glass orifice diameter 3 milimeters.

Additional operating ranges are as follows:

| Velocity | jet | 200 m/sec – 900 m/sec |
|---|---|---|
|  | blast | 200 m/sec – 800 m/sec |
| Pressure | jet | .5 to 50 bars |
|  | blast | .05 to .5 bars |
| Temperature | jet | 20° to 1800° C |
|  | blast | 1300° to 1800° C |
| Kinetic Energy Ratio - jet to blast |  | 10/1 – 1000/1 |

A typical operation according to the present invention may be carried out as given in the Example below.

EXAMPLE

| Glass formulation: | |
|---|---|
| $SiO_2$ | 46.92 |
| $Fe_2O_3$ | 1.62 |
| $Al_2O_3$ | 9.20 |
| MnO | 0.16 |
| CaO | 30.75 |
| MgO | 3.95 |
| $Na_2O$ | 3.90 |
| $K_2O$ | 3.50 |

All parts by weight.

Physical Properties

| Viscosity | | 30 poises at 1310° C |
|---|---|---|
|  |  | 100 poises at 1216° C |
|  |  | 300 poises at 1155° C |
| Glass | orifice | 3mm |
|  | flow | 100 kg/day per orifice |
| Blast | temperature | 1550° C |
|  | pressure | .25 bar |
|  | velocity | 530 m/s |
| Jet | temperature | 20° C |
|  | pressure | 6 bar |
|  | velocity | 330 m/s |
|  | orifice diameter | 1 mm |
| Ratio of Kinetic energies | | $\dfrac{Jet}{Blast} = \dfrac{24}{1}$ |
| Fiber diameter | | 6 microns |

We claim:

1. A process for converting attenuable material into a fiber comprising generating a gaseous blast and a gaseous jet, the direction and the kinetic energy per unit of volume of the jet being such that the jet penetrates into the blast, thereby forming a zone of interaction in proximity of the path of penetration of the carrier jet into the blast, and delivering a stream of the attenuable material to the boundary of the blast so as to enter the zone of interaction, the source of the carrier jet being spaced from the blast and the said stream of material being first introduced into currents of ambient gas induced by the carrier jet to subject the stream to an initial or partial attenuation and form a continuous filament before reaching the boundary of the blast, the partially attenuated stream being thereafter drawn into a fiber by a second attenuation in the zone of interaction.

2. A process as defined in claim 1 in which the carrier jet is located in a position which with respect to the direction of flow of the blast is upstream of the stream of attenuable material.

3. A process as defined in claim 2 in which the carrier jet is directed at an angle to the vertical so as to intercept the path of the stream of attenuable material at a point above the upper boundary of the blast.

4. A process as defined in claim 1 in which the stream of attenuable material is fed by gravity from a point spaced appreciably above the elevation at which the stream is delivered to the carrier jet.

5. Process according to claim 4 characterized in that the angle of the direction of the carrier jet with respect to the stream of attenuable material is 3° to 45°.

6. Process according to claim 4 characterized in that the stream of attenuable material is delivered from a point spaced above the zone of introduction of the stream into the currents of ambient gas induced by the jet, and in which the flow of the stream from said point to said zone of interaction results in reduction in diameter of the stream before it reaches said zone of interaction.

7. A process for converting attenuable material into a fiber comprising establishing a stream of the attenuable material, subjecting the stream to a two-stage attenuation operation of which the first stage is effected by delivering the stream of the material to an isolated gaseous carrier jet to be carried thereby and thus partially attenuated in the form of a continuous filament, the approach of the stream to the carrier jet being effected by induction effects of the jet, the second stage being effected by establishing a gaseous blast which is directed in a path transverse to and intercepting the carrier jet downstream of the point of delivery of the stream of material to the carrier jet, the transverse dimensions of the principal current being greater than those of the carrier jet and the carrier jet having greater kinetic energy per unit of volume than the blast, thereby providing for establishing a zone of interaction of the carrier jet and blast by penetration of the blast by the jet and for carrying of said filament to the zone of interaction and thereby completing the conversion of the stream into fiber.

8. A process according to claim 7 in which the cross section of the stream of attenuable material is smaller than the cross section of the carrier jet in the region where the stream meets the carrier jet.

9. A process according to claim 7 in which the stream of attenuable material is a stream of molten thermoplastic mineral material.

10. Apparatus for converting attenuable material into a fiber comprising means for producing a gaseous blast and means for producing a gaseous jet, the direction and the kinetic energy per unit of volume of the jet being such that the jet penetrates into the blast, thereby establishing a zone of interaction in proximity of the path of penetration of the carrier jet into the blast, and means for bringing a stream of the attenuable material to the boundary of the principal current so as to enter into the zone of interaction, the means for producing the carrier jet being spaced from the blast, and the means for introducing the stream of attenuable material being arranged to first introduce the stream into currents of air induced by the carrier jet so that the stream is subjected to an initial or partial attenuation to form a continuous filament and thereafter deliver the filament to the boundary of the blast where the filament enters the blast and is drawn into a fiber by a second attenuation in said zone of interaction.

11. Apparatus for making fibers from attenuable material comprising supply means for said material having a delivery orifice positioned for downward delivery of a stream of said material, means having a discharge outlet for establishing a gaseous blast spaced below the material delivery orifice and directed transverse to the said stream, and means for establishing a gaseous carrier jet including a jet discharge orifice directing the jet downwardly toward and penetrating the blast, the blast having a transverse dimension in the direction of the path of penetration by the carrier jet, which dimension is appreciably greater than the transverse dimension of the carrier jet to thereby establish a zone of interaction between the blast and the carrier jet, the carrier jet orifice and the material delivery orifice being relatively positioned to provide for impingement of the stream of attenuable material on the carrier jet at a point spaced from the blast and thus provide for travel of the stream of attenuable material with the carrier jet to the zone of interaction of the jet with the current.

12. Apparatus as defined in claim 11 in which the means for establishing the gaseous carrier jet, is located in a position which, with relation to the direction of flow of the blast, is upstream of the stream of attenuable material.

13. Apparatus as defined in claim 12 in which the means for establishing the gaseous carrier jet is angularly positioned to cause the jet to penetrate the blast in a zone horizontally offset from the glass orifice.

14. Apparatus as defined in claim 12 in which the means for establishing the carrier jet is positioned to direct the jet in a path at an angle to the general direction of flow of the blast which angle is from about 45° to about 87°.

15. Apparatus according to claim 11 in which the means for producing the carrier jet is spaced from the blast from 30 to 60 mm.

16. Apparatus according to claim 11 in which a jet orifice is used having a diameter of 0.3 to 3 mm.

17. Apparatus according to claim 11 including means for delivering a stream of attenuable material, which means is located, with reference to the direction of flow of the stream, at a distance of from 0 to 150 mm, from the orifice of the means for producing the carrier jet.

18. Apparatus according to claim 11 in which the means for delivering the stream of attenuable material comprises a metering orifice having a diameter of from 1 to 10 mm.

19. Apparatus according to claim 11 and having a carrier jet orifice and an orifice for the attenuable material spaced from each other in the direction of flow of the blast by a distance of from 1 to 15 mm.

20. Apparatus according to claim 11 in which the means for producing the blast includes a gas discharge orifice having a dimension in the direction from which the stream of attenuable material approaches the principal current, which dimension is from 10 to 50 mm.

21. Apparatus according to claim 11 in which the blast outlet and the center line of the material delivery orifice are positioned in spaced relation to each other in a direction transverse to the flow of the stream of attenuable material, such spacing being from 0 to 30 mm.

22. Apparatus according to claim 11 in which a plurality of fiberizing centers are provided each including supply means for attenuable material and each including means for producing a carrier jet associated with the supply means, and blast producing means cooperating with said jets to provide zones of interaction for each jet.

23. Apparatus according to claim 22 in which the blast producing means comprises common blast producing means associated with a plurality of said fiberizing centers.

24. Process according to claim 4 characterized in that the angle of the direction of the carrier jet with respect to the stream of attenuable material is approximately 10°.

25. Apparatus according to claim 11 in which the means for producing the carrier jet is spaced from the blast in the neighborhood of 45 mm.

26. Apparatus according to claim 11 in which a jet orifice is used having a diameter in the neighborhood of 1 mm.

27. Apparatus according to claim 11 including means for delivering a stream of attenuable material, which means is located, with reference to the direction of flow of the stream, at a distance of about 85 mm from the orifice of the means for producing the carrier jet.

28. Apparatus according to claim 11 in which the means for delivering the stream of attenuable material comprises a metering orifice having a diameter in the neighborhood of 4 mm.

29. Apparatus according to claim 11 and having a carrier jet orifice and an orifice for the attenuable material spaced from each other in the direction of flow of the blast by a distance in the neighborhood of 5 mm.

30. Apparatus according to claim 11 in which the means for producing the blast includes a gas discharge orifice having a dimension in the direction from which the stream of attenuable material approaches the principal current, which dimension is in the neighborhood of 25 mm.

31. Apparatus according to claim 11 in which the blast outlet and the center line of the material delivery orifice are positioned in spaced relation to each other in a direction transverse to the flow of the stream of attenuable material, such spacing being in the neighborhood of 5 mm.

* * * * *